United States Patent [19]

Clegg

[11] Patent Number: 4,577,936

[45] Date of Patent: Mar. 25, 1986

[54] CONICAL BEAM CONCENTRATOR

[76] Inventor: John E. Clegg, 2320 Keystone Dr., Orlando, Fla. 32806

[21] Appl. No.: 656,807

[22] Filed: Oct. 1, 1984

[51] Int. Cl.⁴ .............................................. G02B 13/18
[52] U.S. Cl. ..................................... 350/432; 126/440
[58] Field of Search ........................ 350/432; 126/440

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Rebecca D. Gass

[57] ABSTRACT

An upper component lens which refracts a convergent conical incipient beam of diffused sunlight, forming an annular beam and a convergent conical beam; a middle component lens which refracts the annular and convergent conical beams, forming a convergent conical beam; and a lower component lens which refracts the convergent conical beam, forming a concentrated whole beam.

1 Claim, 2 Drawing Figures

CONICAL BEAM CONCENTRATOR

BACKGROUND

The code designation of the concentrator is 3RT:C (R—refracting section of a component lens, T—transmitting section of a component lens, and C—concentrating stage lens).

Prior art is limited to conical lenses which receive and emit beams which are parallel to the vertical optic axis.

DRAWINGS

DESCRIPTION

Figure 1:
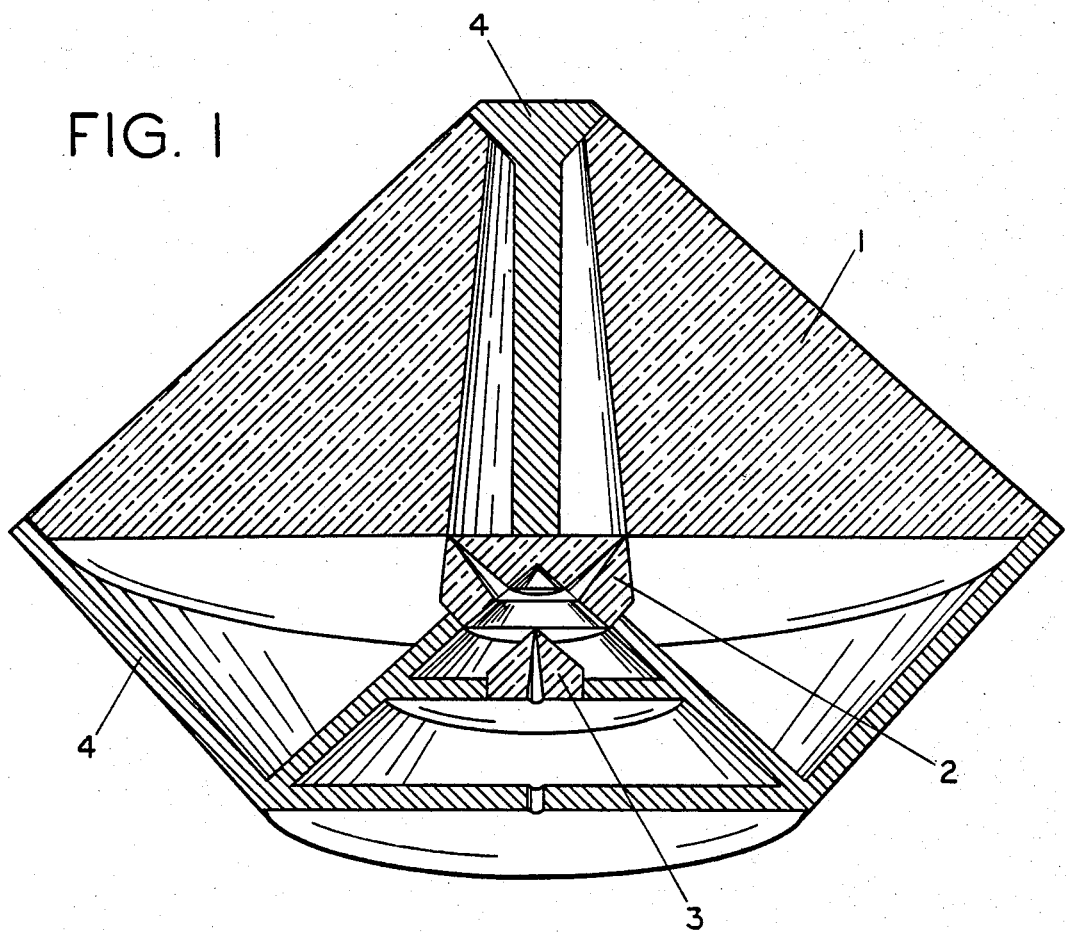
FIG. 1 is an elevation of the conical beam concentrator with the lenses shown in section.

FIG. 1 shows the conical beam concentrator 3RT:C with upper component lens RT 1, middle component lens RT 2 and lower component lens RT 3 mounted in casing 4.

Figure 2:
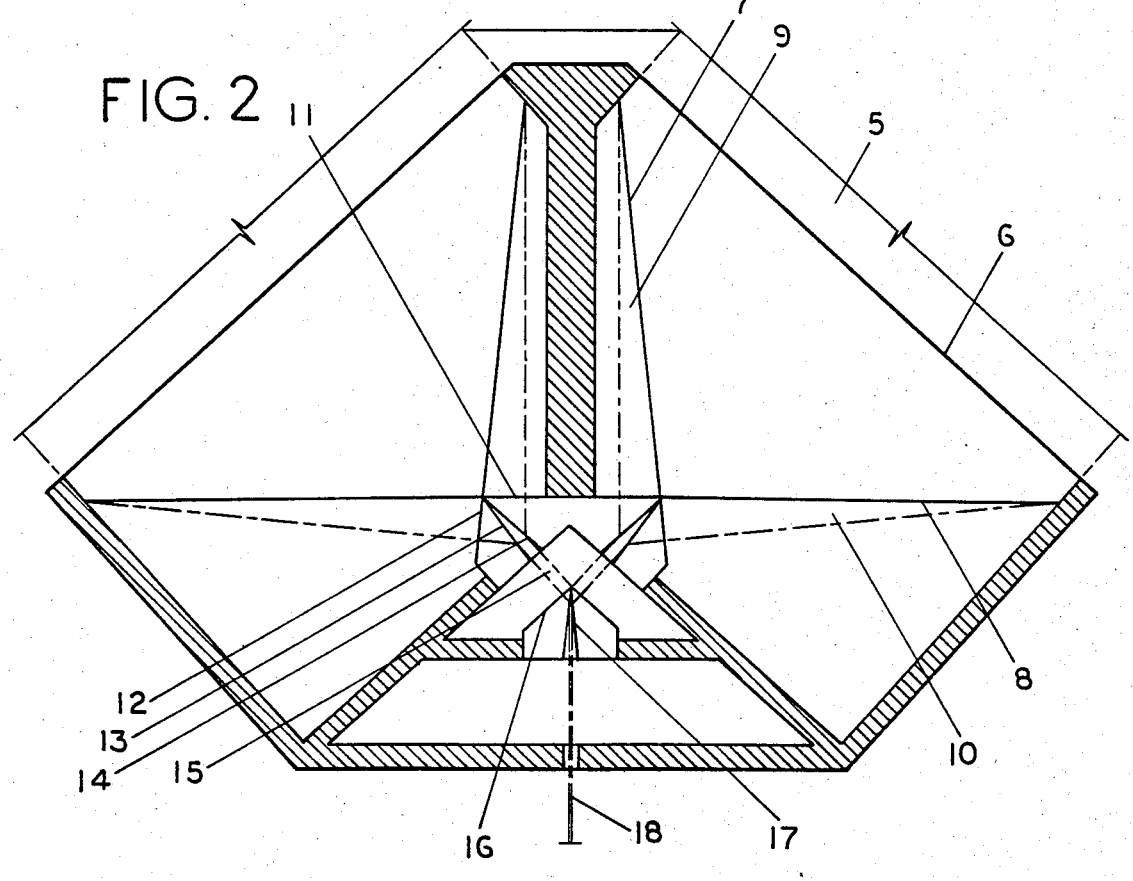
FIG. 2 is an elevation of the concentrator with a ray diagram.

FIG. 2 shows the concentrator with a ray diagram. Convergent conical incipient beam 5 of diffused sunlight is received and transmitted by convex conical section 6, refracted by concave conical section 7, forming annular beam 9, and refracted by planar section 8, forming convergent conical beam 10.

Planar section 11 and convex conical section 12 transmit beams 9 and 10. Concave conical section 13 and convex conical section 14 refract beams 9 and 10, forming convergent conical beam 15.

Beam 15 is transmitted by convex conical section 16 and refracted by concave conical section 17, forming concentrated whole beam 18 which is emitted parallel to the vertical optic axis of the concentrator.

The intensity of concentrated whole beam 18 is as follows;

*Area of incipient beam/area of concentrated beam = intensity.*

$$30{,}130 \text{ mm}^2 / 0.062 \text{ mm}^2 = 485{,}967$$

I claim:

1. A conical beam concentrator comprising in general three component lenses which receive a convergent conical incipient beam of diffused sunlight and emit a concentrated circular whole beam parallel to the optic axis of the lenses, and comprising in particular;

an upper component lens RT (1) having a convex conical section (6) which receives and transmits a convergent conical incipient beam (5) of diffused sunlight, and having a concave conical section (7) which refracts incipient beam (5), forming annular beam (9), and having a planar section (8) which refracts incipient beam (5), forming convergent conical beam (10), a middle component lens RT (2) mounted below upper component lens RT (1) and having a planar section (11) which transmits annular beam (9), having a convex conical section (12) which transmits convergent conical beam (10), having a convex conical section (14) which refracts annular beam (9) and a concave conical section (13) which refracts convergent conical beam (10), forming convergent conical beam (15), and a lower component lens RT (3) mounted below middle component lens RT (2) and having a convex conical section (16) which transmits convergent conical beam (15), and having a concave conical section (17) which refracts convergent conical beam (15), forming concentrated whole beam (18) which is emitted parallel to the optic axis of the concentrator.

* * * * *